United States Patent

Nielsen et al.

[11] Patent Number: 5,954,964
[45] Date of Patent: Sep. 21, 1999

[54] PROCESS FOR ENHANCING DEWATERING OF TREATED BIOSOLIDS IN A WASTEWATER TREATMENT SYSTEM

[75] Inventors: Bente Elise Nielsen, Charlottenlund, Denmark; R. David Holbrook, Cary, N.C.

[73] Assignee: Krüger, Inc., Cary, N.C.

[21] Appl. No.: 08/901,854

[22] Filed: Jul. 29, 1997

[51] Int. Cl.[6] .................................................. C02F 11/04
[52] U.S. Cl. ......................... 210/609; 210/613; 210/631; 210/727; 210/728
[58] Field of Search .................................. 210/609, 612, 210/613, 626, 631, 727, 728, 734

[56] References Cited

U.S. PATENT DOCUMENTS

| | | | |
|---|---|---|---|
| 3,409,546 | 11/1968 | Mogelwicki et al. | 210/728 |
| 4,246,099 | 1/1981 | Gould et al. | 210/609 |
| 4,481,115 | 11/1984 | Wade et al. | 210/727 |
| 4,792,406 | 12/1988 | Allenson et al. | 210/609 |
| 4,915,840 | 4/1990 | Rozich | 210/613 |
| 5,141,646 | 8/1992 | Rozich | 210/613 |
| 5,213,693 | 5/1993 | McGrow et al. | 210/728 |
| 5,492,624 | 2/1996 | Rozich | 210/613 |
| 5,587,081 | 12/1996 | Norcross et al. | 210/612 |
| 5,643,461 | 7/1997 | Neff et al. | 210/728 |

*Primary Examiner*—Thomas G. Wyse
*Attorney, Agent, or Firm*—Rhodes, Coats, & Bennett, LLP

[57] ABSTRACT

The present invention comprises a wastewater treatment process wherein the waste activated sludge is digested to produce treated biosolids which are then directed to a dewatering facility that removes water from the treated biosolids. Before or during the dewatering process, both a low molecular weight polymer and a high molecular weight polymer are added to the treated biosolids. The addition of the two polymers of different molecular weights results in the treated biosolids coagulating and then forming flocs of biosolids that effectively drives water from the flocs and renders the flocs more susceptible to an efficient and effective dewatering process.

14 Claims, 2 Drawing Sheets

PROCESS FOR ENHANCING DEWATERING OF TREATED BIOSOLIDS IN A WASTEWATER TREATMENT SYSTEM

FIELD OF THE INVENTION

The present invention relates to wastewater treatment systems and, more particularly, to a process of adding a low molecular weight and a high molecular weight polymer to digested treated biosolids to increase the efficiency of sludge dewatering and to produce a relatively clean dewatered sludge that can be economically transported.

BACKGROUND OF THE INVENTION

Activated sludge systems are widely used throughout the world to treat wastewater and to particularly remove nutrients such as nitrogen and phosphorus from the wastewater as well as reduce the BOD levels within the wastewater. See, for example, U.S. Pat. Nos. Re. 32,429 and 4,874,519, the disclosures of which are expressly incorporated herein by reference.

Typically, in an activated sludge system, wastewater influent is directed through a series of treatment zones and subjected to various forms of treatment, for example, anaerobic, aerobic, and/or anoxic treatment. After such treatment, the wastewater is directed to a final clarifier which separates sludge in the wastewater from a purified effluent. The purified effluent is discharged into a stream or lake, for example, while the sludge from the final clarifier is returned to the head of the activated sludge system and mixed with the influent wastewater to form what is commonly referred to as mixed liquor. Throughout the wastewater treatment process, the sludge from the final clarifier is recycled through the activated sludge system. The biomass or microorganisms associated with the recycled sludge act to effectively remove nutrients such as nitrogen and phosphorous and reduce the BOD levels within the wastewater being treated.

However, the sludge being recycled through the activated sludge system has to be continually removed or wasted from the process. Usually, the most convenient method of disposal of this sludge is by land applications, for example, as an additive or fertilizer to an agricultural field. However, any contaminants must first be removed or separated from the sludge. Therefore, in a typical activated sludge system or process, a portion of the sludge leaving the final clarifier, also referred to as waste activated sludge (WAS), is directed to a digester where the sludge is treated and cleaned by removing pathogens and volatile elements.

Various levels of treated sludge can be realized through the digestion process. For example, some wastewater treatment facilities desire a very clean sludge that is capable of being disposed on agricultural fields or in landfills. This digested sludge is often referred to as Class A sludge. There are, other classes of sludge that are not as clean or pure as a Class A sludge. In any event, there are numerous types of sludge digesters that can produce Class A sludge and other classes of sludge as well. One very popular digester used today is an autothermal thermophilic aerobic digestion system (ATAD). Here, the incoming waste activated sludge is subjected to a mechanical thickening process and then stored in a holding tank for metering to the ATAD system. The ATAD system consists of one to three serially-connected reactors, possibly in multiple series, through which the waste activated sludge undergoes an aerobic digestion process.

Depending on the method of disposal of the final product, the treated waste may be in different forms. As stored in a post-ATAD holding tank, the sludge contains a significant amount of water and is used for such applications as roadside watering. In further post-ATAD processing, the sludge may be subjected to a dewatering process to obtain a more concentrated final product. When water is removed, the sludge attains the consistency of approximately that of wet soil and is used as an additive to agricultural fields or is disposed of in solid waste landfills.

The major drawback of the disposal of the un-dewatered sludge is the cost of transporting the treated waste. Since a majority of the composition is water, the majority of the transport cost is a direct result of the water content of the sludge. Furthermore, there is a negative stigma attached to the disposal of this waste, liquid or solid. "Solid" waste has the advantage of lower transportation costs and easier means of disposal in specific isolated locations such as solid waste landfills. Thus, it is often desirable to separate as much water as possible from the sludge before disposal. Therefore, after digestion, the sludge which is often referred to as treated biosolids is directed to a dewatering facility where excess water is removed from the biosolids. The separated effluent can be routed back to the head of the plant and directed through the activated sludge system for further treatment.

Dewatering of treated biosolids is currently achieved by the use of mechanical means such as a centrifuge. A polymer is often added to the wastewater to facilitate the formation of flocs of biosolids. Since the solid component of the wastewater solution is generally anionic, the theory is that the introduction of a cationic polymer will cause bonding of the sludge with the polymer in furtherance of a charge neutralization process. Flocculation, or bonding of the sludge with the polymer, will have the secondary effect of driving water out of the resulting flocs. However, good flocculation requires thorough mixing of the polymer with the sludge. Currently, mixing of the polymer with the sludge is difficult and summarily results in a very high amount of polymer consumption to achieve even poor flocculation of the sludge. Moreover, the current methods yield high polymer costs due to the amount of polymer used and high transportation costs since the sludge is insufficiently dewatered.

One key to obtaining an enhanced flocculation effect from the polymer is to ensure thorough mixing of the polymer with the sludge. Means such as diluting the polymer with water before mixing with the sludge or subjecting the polymer/sludge mixture to significant agitation are typical examples of the necessary steps that have been taken toward increasing the efficiency of the dewatering process. However, to date, this has only resulted in limited gains in dewatering efficiency with questionable cost effectiveness.

SUMMARY AND OBJECTS OF THE INVENTION

The present invention relates to an ATAD sludge digestion and dewatering process that significantly increases the efficiency of dewatering sludge and reduces overall polymer cost, while at the same time decreases transportation cost associated with the disposal of sludge or treated biosolids.

In order to increase the dewatering efficiency, the present invention adds both a low molecular weight polymer and a high molecular weight polymer into treated biosolids before or during the dewatering process. Mixing the low molecular weight and high molecular weight polymers with the biosolids promotes a highly efficient coagulation and flocculation process. That is, the mixing of the low molecular weight and high molecular weight polymers with the treated biosolids causes the treated biomass to coagulate and form flocs and in the process water is driven from the formed flocs and further, the water contained within the formed floc is more readily extracted therefrom during a mechanical dewatering process.

In one embodiment of the present process, the low molecular weight polymer is introduced into the biosolids upstream from a point where the high molecular weight polymer is added into the biosolids. In this case, both the low molecular weight polymer and the high molecular weight polymer are added to the biomass prior to the biomass reaching the dewatering facility. In an alternate embodiment, the low molecular weight polymer in the form of a powdered solid is mixed with a high molecular weight polymer in a liquid form, and the mixture is then introduced into the biomass prior to the biomass reaching the dewatering facility.

When the dual polymers are thoroughly mixed with the biosolids through a mechanical mixing process, flocculation and subsequent dewatering of the biosolids is enhanced over the single polymer process used in conventional dewatering processes. This result is obtained since the low molecular weight polymer acts as a coagulant and the high molecular weight polymer acts as the flocculant. Thus, the effect of the low molecular weight polymer is to decrease the viscosity of the biosolids in solution or begin the flocculation process by coagulation. The high molecular weight polymer then acts as a flocculant and its effect is magnified since the biosolids are coagulated and less dispersed in solution due to the addition of the low molecular weight polymer. Therefore, more thorough mixing of the flocculating high molecular weight polymer with the biosolids is possible and results in greater flocculation efficiency of the polymer addition process.

It is therefore an object of the present invention to provide a wastewater treatment process that produces a clean, manageable and stable sludge that can be transported to a disposal site at a reasonable cost.

Another object of the present invention is to provide an efficient method of dewatering sludge that reduces overall polymer cost and which produces a sludge having a moisture content that renders the sludge capable of being economically transported.

Still a further object of the present invention is to provide a process that calls for the mixture of both a low molecular weight polymer and a high molecular weight polymer with treated biosolids or sludge to induce coagulation and flocculation of the biosolids.

Other objects and advantages of the present invention will become apparent and obvious from a study of the following description and the accompanying drawings which are merely illustrative of such invention.

DETAILED DESCRIPTION OF THE INVENTION

In a conventional wastewater treatment system using activated sludge, wastewater influent is directed through a series of treatment zones and subjected to various forms of treatment, for example, anaerobic, aerobic, and/or anoxic treatment. After such treatment, the wastewater is directed to a final clarifier which separates sludge in the wastewater from a purified effluent. The purified effluent is discharged into a stream or lake, for example, while the sludge from the final clarifier is returned to the head of the activated sludge system and mixed with the influent wastewater. Throughout the wastewater treatment process, the sludge from the final clarifier is recycled through the activated sludge system. The biomass or microorganisms associated with the recycled sludge acts to effectively remove nutrients such as nitrogen and phosphorous, reduce the BOD levels within the wastewater, and generally remove contaminants.

However, the sludge being produced in the activated sludge system must be continually removed or wasted from the process. The portion of the sludge removed from the recycled activated sludge is referred to as the waste activated sludge. In a typical activated sludge system, the waste activated sludge is directed to a digestion system where the sludge is treated and cleaned by removing pathogens and other contaminants. After digestion, the sludge, often referred to as treated biosolids, is considered treated and suitable for disposal. A typical means of disposal involves spreading the sludge on land or roadsides. In some instances, the treated biosolids are first directed to a dewatering facility where mechanical means, such as a centrifuge, are used to remove water from the biosolids. Here, after dewatering, the biosolids are in a condensed form wherein the biosolids can be disposed of as solid waste.

The dewatering process generally requires that the biosolids exist in a cohesive and consistent state such that mechanical dewatering removes substantially only water and very little, if any, of the biosolids. The cohesion of the biosolids is often referred to as flocculation and the resulting masses of biosolids are referred to as flocs. In a conventional dewatering process, flocculation of the biosolids is often assisted by the addition of a single polymer to the biosolids prior to or concurrently with dewatering. However, from experience, the single polymer has not been very efficient in facilitating the flocculation process. This means that a large amount of polymer must be added to the biosolids to achieve marginally acceptable flocculation. Not only does this increase polymer costs, but transportation costs remain high since poor flocculation indicates that a large amount of water is not separated from the biosolids in dewatering.

Figure 1:
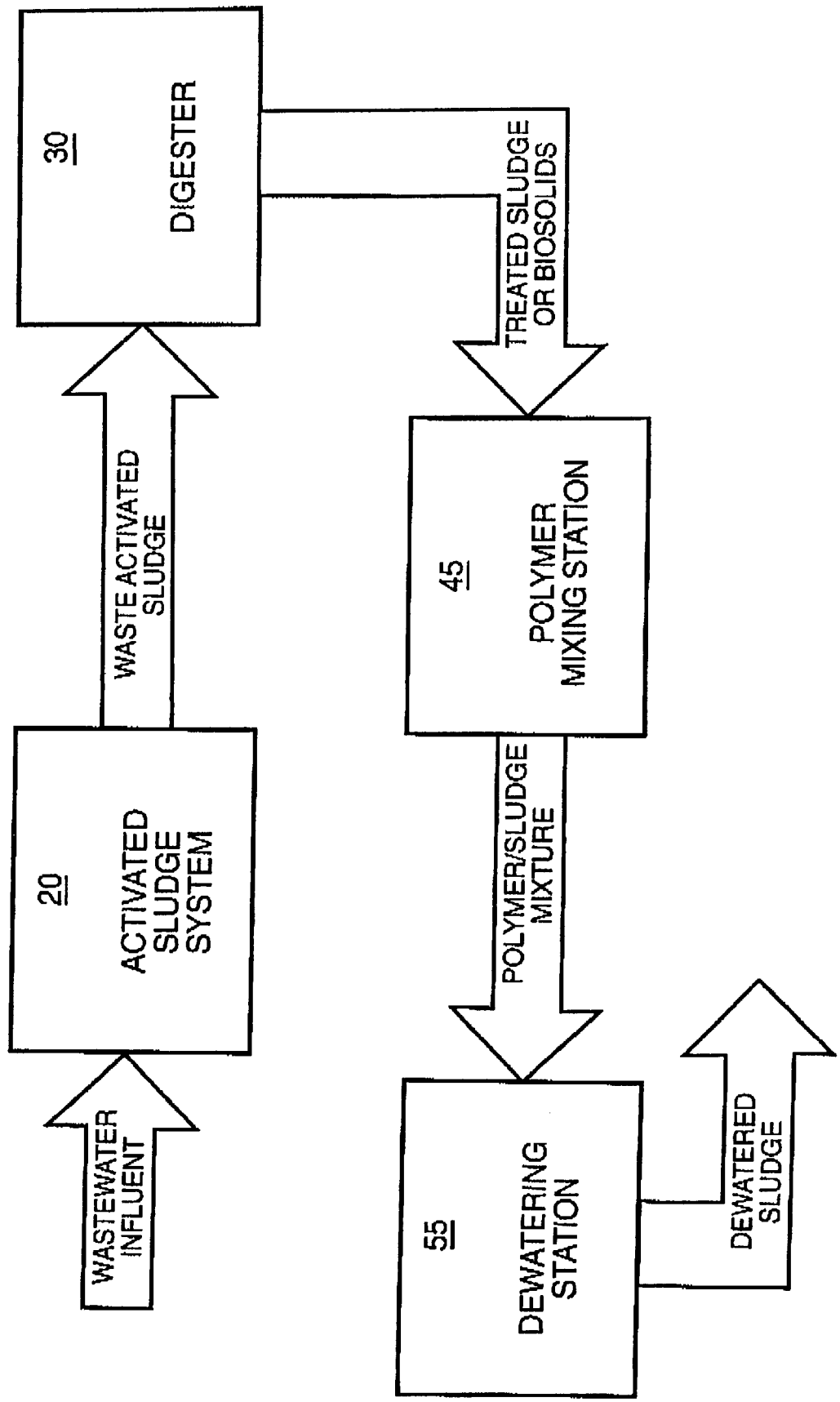
FIG. 1 is a schematic illustration of the basic wastewater treatment process of the present invention.

Now referring to FIG. 1, a conventional wastewater treatment process is shown and generally indicated by the numeral 10. In general, wastewater influent enters an activated sludge system 20. Typically, an activated sludge system includes a series of treatment zones followed by a final clarifier. In the final clarifier, sludge is separated from purified effluent and the separated sludge is recycled through one or more treatment zones of the activated sludge system 20. The recycled sludge is typically referred to as activated sludge. Examples of activated sludge systems can be found in U.S. Pat. Nos. 5,213,681 and 5,182,021, the disclosures of which are expressly incorporated herein by reference. A portion of the return activated sludge is directed from the activated sludge system for further treatment. This sludge is referred to as waste activated sludge.

The waste activated sludge is directed to a digester 30. The digester 30 removes pathogens and other contaminants from the waste activated sludge and produces a clean treated sludge or biosolids. After the sludge has been subjected to digestion, the resulting biosolids are directed to a dewatering station 55. But prior to or during the dewatering, the digested biosolids are subjected to a dual polymer treatment at a polymer mixing station 45. As will be discussed below, the dual polymer treatment entails mixing both a low molecular weight polymer and a high molecular weight polymer with the biosolids for the purpose of conditioning and restructing the biosolids so that the water coupled or bound within the biosolids can be more efficiently removed during dewatering. In any event, after the dual polymer treatment and after dewatering, the dewatered sludge is appropriately conditioned for disposal.

The addition of both a low molecular weight polymer and a high molecular weight polymer to the biosolids greatly increase flocculation efficiency during dewatering. In the dual polymer process, the low molecular weight polymer acts as a coagulant and increases the flocculation affinity of the low molecular weight polymer and treated biosolids mixture. The addition of the high molecular weight polymer as a flocculant then facilitates the formation of flocs in the treated biosolids. Since the flocculation efficiency is increased in the dual polymer process over a single polymer process, less total polymer is required to produce flocs in the treated biosolids and to raise the dewatering efficiency. That is, it is postulated that the required polymer dosage measured in pounds of polymer added per ton of treated biosolids has a lower net total for the dual polymer process than for a single polymer process. This results in a lower cost for the amount of polymer necessary for dewatering. In addition, since the dewatering efficiency is concurrently increased, transportation costs are lower for the waste output from the dual polymer process due to a higher solids content in the dewatered biosolids.

Figure 2:
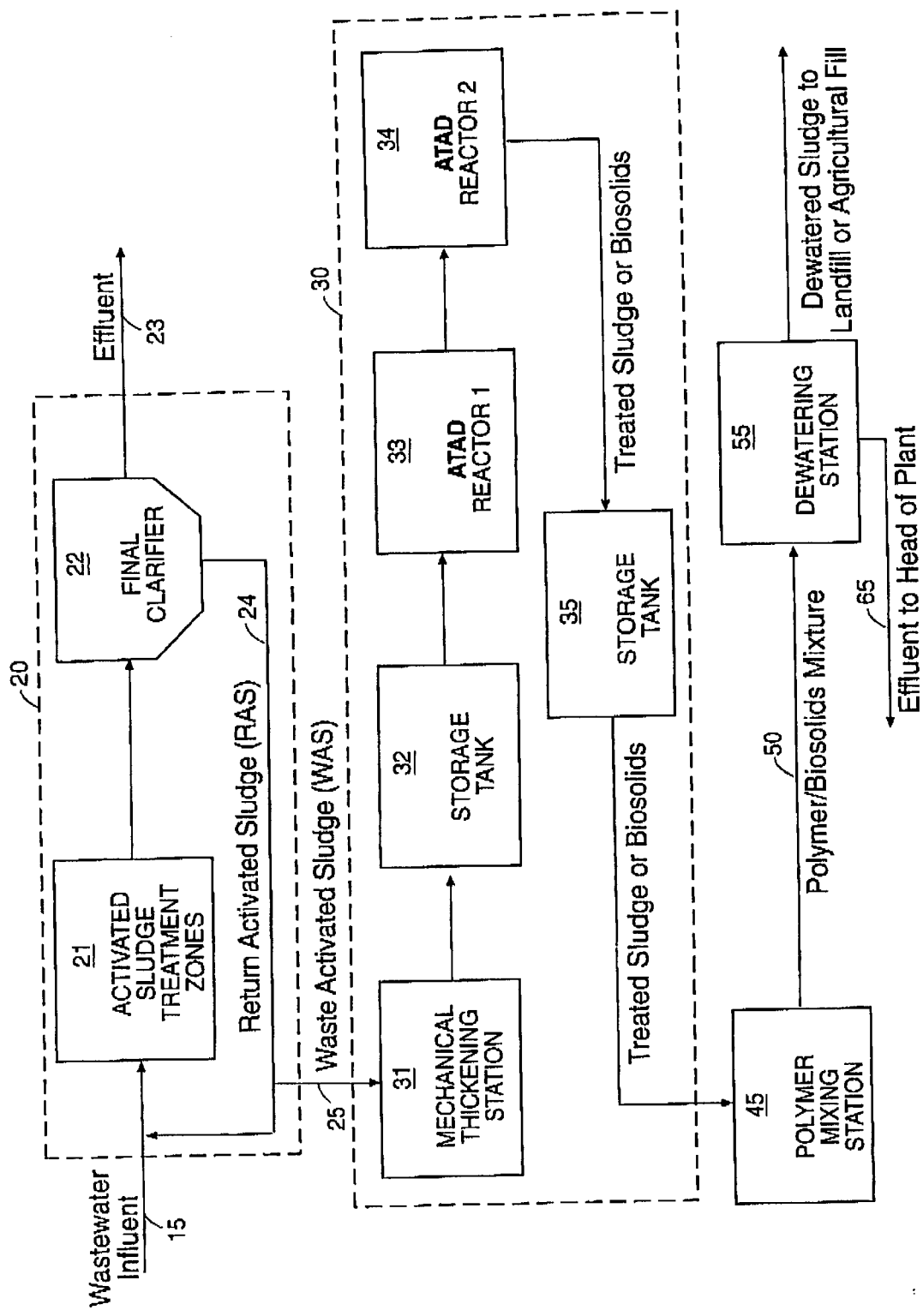
FIG. 2 is a schematic illustration of the wastewater treatment process of the present invention showing a particular process for treating and dewatering waste activated sludge.

Referring now to FIG. 2, the wastewater treatment process 10 of the present invention is shown in greater detail. Wastewater influent enters, via line 15, the activated sludge treatment system 20, which basically includes a series of activated sludge treatment zones 21 and a final clarifier 22. As previously described, the activated treatment zones 21 include various treatment zones such as aerobic, anaerobic, and/or anoxic treatment zones, for treating the wastewater influent. After the activated treatment zones 21, the wastewater enters the final clarifier 22 which separates sludge in the wastewater and produces a purified effluent that exits the final clarifier via 23. The purified effluent 23 leaves the wastewater treatment process 10 in a form suitable for discharge into a stream or a lake, for example. The sludge separated by the final clarifier 22, also known as return activated sludge (RAS), is returned via line 24 to the head of the activated sludge system 20 and mixed with incoming wastewater influent to form what is commonly referred to as mixed liquor.

The microorganisms associated with the return activated sludge remove nutrients such as nitrogen and phosphorous and reduces BOD and other contaminant levels within the wastewater. However, since the recycled activated sludge has a finite operational life, this sludge must continually be removed or wasted from the activated sludge system 20.

The portion of the recycled activated sludge removed from the process is known as waste activated sludge (WAS). Due to its primarily organic content, the waste activated sludge is suited for disposal in land applications following further treatment and purification. Note that, in a typical wastewater treatment process, the wastewater influent may be subjected to a primary treatment wherein a portion of the solids content may be removed from the wastewater influent prior to entering the activated sludge treatment system 20. The solids content removed in the primary treatment is known as primary sludge. Where primary treatment is used, the primary sludge can be mixed with the waste activated sludge before the resulting sludge mixture is subjected to further purification in a digestion process.

Typically, the waste activated sludge entering the digestion process contains approximately 0.8%–1.2% by weight of total suspended solids (TSS), in other words, 8,000 to 12,000 mg of solids per liter of sludge. The digestion process may comprise, for example, an autothermal thermophilic aerobic digestion system, sometimes referred to as ATAD. For optimum performance, an ATAD digestion system requires an input sludge containing approximately 4%–6% total suspended solids (40,000 to 60,000 mg of solids per liter of sludge). Thus, the input sludge at 0.8%–1.2% TSS is first directed to a mechanical thickening station 31 in order to produce a sludge with 4%–6% by weight of TSS. This sludge is then stored in a holding tank 32 for metering to the ATAD reactors, 33 and 34. The ATAD system shown in FIG. 2 contains two reactors, 33 and 34, though ATAD systems may use three reactors, possibly in multiple series, depending on the condition of the sludge being treated. The aerobic treatment of the sludge in the ATAD reactors, 33 and 34, removes pathogens and other contaminants from the sludge. The result is a fully treated Class A sludge suitable for disposal in land applications. The treated sludge is then stored in a holding tank 35 pending further treatment. Details of the ATAD type digesters are not disclosed herein because such systems and processes are well-known in the art and in fact ATAD type digestion systems are sold by Krüger, Inc. of Cary, N.C. USA and the Fuchs Company in Europe, particularly in Germany.

Treated sludge stored in holding tank 35 typically contains approximately 2.5%–3.5% TSS (25,000 to 35,000 mg of solids per liter of sludge). In this form, the treated sludge may be used for applications such as roadside watering. However, since the water content of the biosolids is relatively high, transportation costs are also high. Thus, the treated biosolids are often subjected to dewatering prior to disposal. In the process of dewatering at the dewatering station 56, water removed from the biosolids is directed from the dewatering station via line 65 back to the head of the activated sludge system 20.

The present invention entails adding a low molecular polymer and a high molecular polymer to the biosolids prior to or during the dewatering process. As illustrated in FIG. 2, in one preferred design, the treated biosolids leaving the storage tank 35 are directed to a polymer mixing station 45. There the two different polymers, the low molecular weight polymer and the high molecular weight polymer, can be mixed with the biosolids being directed from the storage tank 35. As pointed out above, the individual polymers can be sequentially mixed with the biosolids or the polymers can be mixed simultaneously with the biosolids. Or the two polymers can be mixed together before they are mixed with the biosolids. In all such cases, the polymers can be mixed with the biosolids before they reach the dewatering station 56 or can be mixed during the actual dewatering process.

Various types of low molecular weight polymers and high molecular weight polymers can be used in the process of the present invention. Both the low and high molecular weight polymers are usually polyacrylamide polymers, but other types of polymers may be used. In addition, either polymer may be in a solid or liquid form. Examples of suitable low molecular weight polymers are Percol 402, Percol 406, Alkafix 357, all manufactured by Allied Colloids, Inc., of Suffolk, Va. Examples of the high molecular weight polymers are Percol 757, Percol 455, and Percol 710, all of which are also manufactured again by Allied Colloids, Inc., of Suffolk, Va.

Typically, the dosage of polymers for the treated biosolids can vary depending on process conditions. In the way of example, the dosage of the low molecular weight polymer can range from approximately 10 to 80 pounds per ton of biosolids while the dosage of the high molecular weight polymers can range from approximately 40 to 110 pounds per ton of the biosolids.

The theory behind the dual polymer process stems from the generally anionic nature of the solids in the treated sludge. The introduction of a cationic low molecular weight polymer means that the anionic solids in the treated sludge or biosolids will be attracted to and will bond with the low molecular weight polymer in furtherance of charge neutralization. The low molecular weight polymer, in some cases, in the form of a powdered solid, will also mix with the treated biosolids more readily and thoroughly than a viscous liquid high molecular weight polymer. However, the polymer chain of a low molecular weight polymer is relatively short and bonding of this chain with the solids in the sludge will result in a small compound known as a coagulation. Since the polymer chain is surrounded by solids, the outer surface of the coagulation will still exhibit an anionic charge. Accordingly, the low molecular weight polymer is known as a coagulant.

While the addition of a low molecular weight polymer to form coagulations furthers the cohesion of the solids, it is not enough to achieve efficient dewatering since the small coagulations do not exclude a significant amount of water. The coagulations, though, serve to decrease the dispersion of the solids in the treated biosolids. The addition of a cationic high molecular weight polymer then furthers flocculation. That is, the relatively long polymer chains of the high molecular weight polymer will attract and bond with the anionic coagulations also in furtherance of charge neutralization. Thus, the large scale bonding of the coagulations to the high molecular weight polymer forms a floc and this process is called flocculation. Accordingly, the high molecular weight polymer is known as a flocculant. Furthermore, more thorough mixing of a viscous liquid high molecular weight polymer with the coagulants in the biosolids is possible since the solids are less dispersed in the treated biosolids. As a net result, flocculation or the cohesion of the solids is enhanced which tends to drive water out of the flocs and leads to more efficient dewatering.

After the polymers have been mixed with the biosolids, the mixture is subjected to conventional dewatering. Dewatering is generally a mechanical process using, for example, a centrifuge. The centrifuge produces dewatered sludge or biosolid and separated water or effluent. The dewatered sludge is then transported away for disposal in land applications while the effluent is directed back to the head of the activated sludge system. In practice, the dual polymer process of the present invention will produce dewatered sludge with 18%–30% TSS by weight (180,000 to 300,000 mg of solids per liter of sludge) which include approximately 95% to 98% of all solids entering the dewatering process. This also indicates that only 2% to 5% of all solids entering dewatering are returned to the head of the activated sludge system 20, which means that only a very small amount of the solids are redirected through the treatment process.

Dewatered sludge with 18%–30% TSS has the consistency of wet soil. In more practical terms, the solids in the treated biosolids have been significantly concentrated since leaving the digestion process. Thus, transportation costs will be greatly reduced since fewer trips will be required in order to dispose of the resulting waste. In addition, less total polymer is required in the dual polymer process than in a single polymer process due to increased flocculation efficiency. Therefore, polymer costs are also reduced.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended claims are intended to be embraced therein.

What is claimed is:

1. A method for digesting and dewatering sludge in a wastewater treatment process, comprising the steps of:
    a) directing wastewater influent through an activated sludge treatment process and producing waste activated sludge;
    b) directing the waste activated sludge through an autothermal thermophilic aerobic digestion (ATAD) process and producing biosolids; and
    c) mixing a low molecular weight polymer and a high molecular weight polymer with the biosolids and subjecting the mixture of low molecular weight polymer, high molecular weight polymer, and biosolids to a dewatering process for removing water from the biosolids and producing a dewatered treated sludge.

2. The method of claim 1 wherein mixing of the low molecular weight polymer with the biosolids occurs prior to the mixing of the high molecular weight polymer with said biosolids.

3. The method of claim 1 wherein the low molecular weight polymer and the high molecular weight polymer are mixed prior to their mixing with the biosolids.

4. The method of claim 1 wherein both the low molecular weight polymer and the high molecular weight polymer are mixed with the biosolids prior to the dewatering process.

5. The method of claim 2 wherein both the low molecular weight polymer and the high molecular weight polymer are mixed with the biosolids prior to the dewatering process.

6. The method of claim 1 wherein at least one of the polymers is mixed with the biosolids during the dewatering process.

7. The method of claim 1 further including producing biosolids with approximately 2.5 to 3.5 percent by weight of total suspended solids (TSS) by the ATAD process and producing a dewatered sludge having approximately 18 to 30 percent by weight of total suspended solids (TSS) from the dewatering process.

8. The method of claim 1 wherein at least one of the polymers is a polyacrylamide polymer.

9. A method for digesting and dewatering sludge in a wastewater treatment process, comprising the steps of:
    a) directing wastewater influent through an activated sludge treatment process and producing waste activated sludge;
    b) directing the waste activated sludge through an autothermal thermophilic aerobic digestion (ATAD) process and producing biosolids;
    c) mixing a low molecular weight polymer with the biosolids to form a coagulation of biosolids;
    d) mixing the coagulation of biosolids with a high molecular weight polymer to form flocs of biosolids; and e) subjecting the flocs of biosolids to a dewatering process for removing water from the flocs of biosolids and producing a dewatered treated sludge.

10. The method of claim 9 wherein the percentage by weight of total suspended solids (TSS) in the dewatered sludge is approximately 5 to 12 times greater than the percentage by weight of total suspended solids (TSS) in the treated biosolids produced by the autothermal thermophilic aerobic digestion (ATAD) process.

11. The method of claim 9 wherein at least one of the polymers is a polyacrylamide polymer.

12. A method for digesting and dewatering sludge in a wastewater treatment process, comprising the steps of:

a) directing wastewater influent through an activated sludge treatment process and producing waste activated sludge;

b) directing the waste activated sludge through an autothermal thermophilic aerobic digestion (ATAD) process and producing biosolids;

c) mixing a low molecular weight polymer and a high molecular weight polymer to form a polymer solution; and d) mixing the polymer solution with the biosolids and subjecting the mixture of polymer solution and biosolids to a dewatering process for removing water from the biosolids and producing a dewatered treated sludge.

13. The method of claim 12 wherein the percentage by weight of total suspended solids (TSS) in the dewatered sludge is approximately 5 to 12 times greater than the percentage by weight of total suspended solids (TSS) in the treated biosolids produced by the autothermal thermophilic aerobic digestion (ATAD) process.

14. The method of claim 12 wherein at least one of the polymers is a polyacrylamide polymer.

* * * * *